Feb. 22, 1955  W. J. MOSES ET AL  2,702,714
SELF-ADJUSTING TOWING CABLE BUMPER GRIP
Filed Feb. 2, 1951
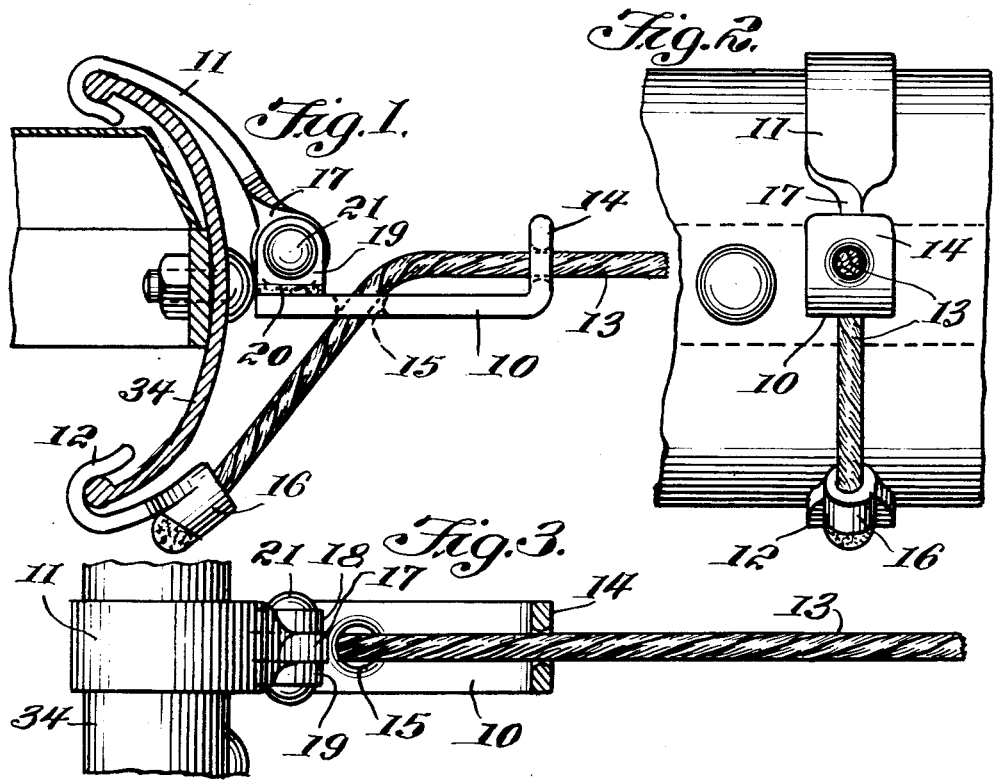
INVENTOR.
William J. Moses
Anton Schmelitsch,
BY Victor J. Evans & Co.
ATTORNEYS United States Patent Office 2,702,714
Patented Feb. 22, 1955

2,702,714

SELF-ADJUSTING TOWING CABLE BUMPER GRIP

William J. Moses and Anton Schmelitsch, Minneapolis, Minn.

Application February 2, 1951, Serial No. 209,132

1 Claim. (Cl. 280—505)

This invention relates to a towing device for motor vehicles, commonly referred to as a hitch, and in particular a base having a gripping jaw pivotally mounted on one end with a cable or chain extended through the base and also having a gripping jaw on the end thereof whereby a force upon the cable urges both of the gripping jaws into gripping relation with upper and lower edges of a bumper or the like.

The purpose of this invention is to provide means for readily attaching the end of a towing cable to a bumper or other part of a motor vehicle wherein the greater the force applied to the towing cable, the greater is the gripping action of the gripping jaws in relation to a bumper and the like.

Various gripping devices have been provided for attaching towing cables and the like to motor vehicles and in the conventional type of attaching device where bolts and nuts are used it is essential to positively lock the parts in position to prevent the gripping elements from working loose. With this thought in mind this invention contemplates a towing grip in which the gripping force increases with the load on the towing cable so that the operator of a towing truck or vehicle has the assurance that the grip at the end of the cable will remain in position.

The object of this invention is, therefore, to provide a device for attaching a towing cable to a bumper or other part of a motor vehicle so that it is only necessary to place one gripping jaw over one side of a bumper or the like and another over the opposite side or edge in order to install the device on a vehicle for towing.

Another object of the invention is to provide a towing cable grip that is installed without the use of wrenches or other tools and that is designed to be attached to conventional parts of a motor vehicle or the like.

A further object of the invention is to provide a towing cable grip in which gripping jaws are forced into gripping relation with an object by force supplied to the towing cable, which is of a simple and economical construction.

With these and other objects and advantages in view the invention embodies an elongated base having a jaw pivotally mounted on one end thereof and with cable guide means on the base, and a cable extended through the base and having a gripping jaw on the end thereof Other features and advantages of the invention will appear from the following description taken in connection with the drawings wherein:

Figure 1 is a side elevational view of the gripping device showing a cable extended through the base and illustrating the device as applied to a bumper and with the bumper shown in section.

Figure 2 is an end elevational view of the device as shown in Fig. 1.

Figure 3 is a plan view of the towing cable gripping device as shown in Fig. 1 showing an eye on the outer end of the base in section.

Referring now to the drawings wherein like reference characters denote corresponding parts the towing cable grip of this invention includes a base 10, a jaw 11 pivotally mounted on one end of the base, and a jaw 12 carried by the end of a cable 13.

With the parts as illustrated in Figs. 1, 2, and 3 the base 10 is provided with an eye 14 at one end through which the cable 13 extends and from the eye 14 the cable extends through an opening 15 in the lower part of the base, as shown in Figs. 1 and 3.

The gripping jaw 12 is provided with a tubular base 16 to which the end of the cable is secured by suitable means.

The gripping jaw 11 is provided with a hub 17 that is positioned between the upwardly extended lugs 18 and 19 which are positioned preferably by welding, as indicated by the numeral 20, on the end of the base and the hub of the jaw is pivotally mounted between the lugs by a rivet 21.

With the parts arranged in this manner the gripping jaws are placed over opposite edges of a bumper, as indicated by the numeral 34, or the like and as force is applied to the cable or chain both of the gripping jaws are urged into gripping relation with the opposite edges of the bumper.

It will be noted that the upper gripping jaw supports the base in a position substantially midway of the width of the bumper whereby the force is applied equally to both of the jaws.

Although the device is illustrated and described as being attached to a bumper, it will be understood that it may also be attached to other suitable parts of vehicles.

It will also be understood that modifications may be made in the design and arrangements of the parts without departing from the spirit of the invention.

What is claimed is:

A towing cable grip for a curved bumper, comprising an elongated base including a main flat portion provided with an opening spaced from its front end, an upstanding flange projecting upwardly from the rear end of said base and arranged at right angles with respect to said base, a cable extending through the opening in the flat portion of the base and through an opening in said flange, said cable having a first portion arranged above said base and a second portion extending downwardly at an angle through the opening in said base, a gripping jaw engaging the lower edge of said bumper and provided with a tubular base receiving the end of the downwardly extending portion of the cable, a pair of spaced parallel lugs extending upwardly from said base at the opposite end from said flange, and a jaw engaging the upper edge of said bumper and provided with a hub pivotally mounted between said pair of lugs, there being registering openings in said lugs and hub, and a securing element pivotally connecting said hub to said lugs and extending through said registering openings, the edges of said lugs being flush with the front edge of said base.

References Cited in the file of this patent

UNITED STATES PATENTS

| 733,989 | Morris | July 21, 1903 |
| 2,435,813 | Williams | Feb. 10, 1948 |